United States Patent

[11] 3,621,127

| [72] | Inventor | Karl Hope<br>P.O. Box 184, E. Stroudsburg, Pa. 18301 |
| --- | --- | --- |
| [21] | Appl. No. | 798,981 |
| [22] | Filed | Feb. 13, 1969 |
| [45] | Patented | Nov. 16, 1971 |

[54] SYNCHRONIZED STEREOSCOPIC SYSTEM
5 Claims, 3 Drawing Figs.

[52] U.S. Cl...................................... 178/6.5,
352/57, 352/63
[51] Int. Cl........................................G03b 35/02,
G03b 35/16, H04n 9/54
[50] Field of Search............................ 178/6.5;
352/57, 62, 63

[56] References Cited
UNITED STATES PATENTS

| 3,358,079 | 12/1967 | Banning ........................ | 178/6.5 |
| 3,415,598 | 12/1968 | Neasham....................... | 352/63 |
| 3,464,766 | 9/1969 | Knauf............................ | 352/63 |

FOREIGN PATENTS

| 21,775 | 12/1916 | Denmark....................... | 352/63 |

*Primary Examiner*—Bernard Konick
*Assistant Examiner*—Howard W. Britton
*Attorney*—Michael Ebert ABSTRACT: A stereoscopic system wherein two displaced images of a scene are projected sequentially on a viewing screen such that right and left images are alternately presented for equal times. The projection device is adapted to generate sync signals indicating the points in time at which the images are alternately presented. The sync signals modulate a high-frequency carrier which is emitted in the viewing area and is intercepted by receivers at portable viewing stations. Each observer is furnished with a viewing station which includes a shuttering spectacle having left and right eye elements that open and close alternately at a rate and in a phase controlled by the sync signals, whereby viewing of the displaced images is coordinated with the shuttering action.

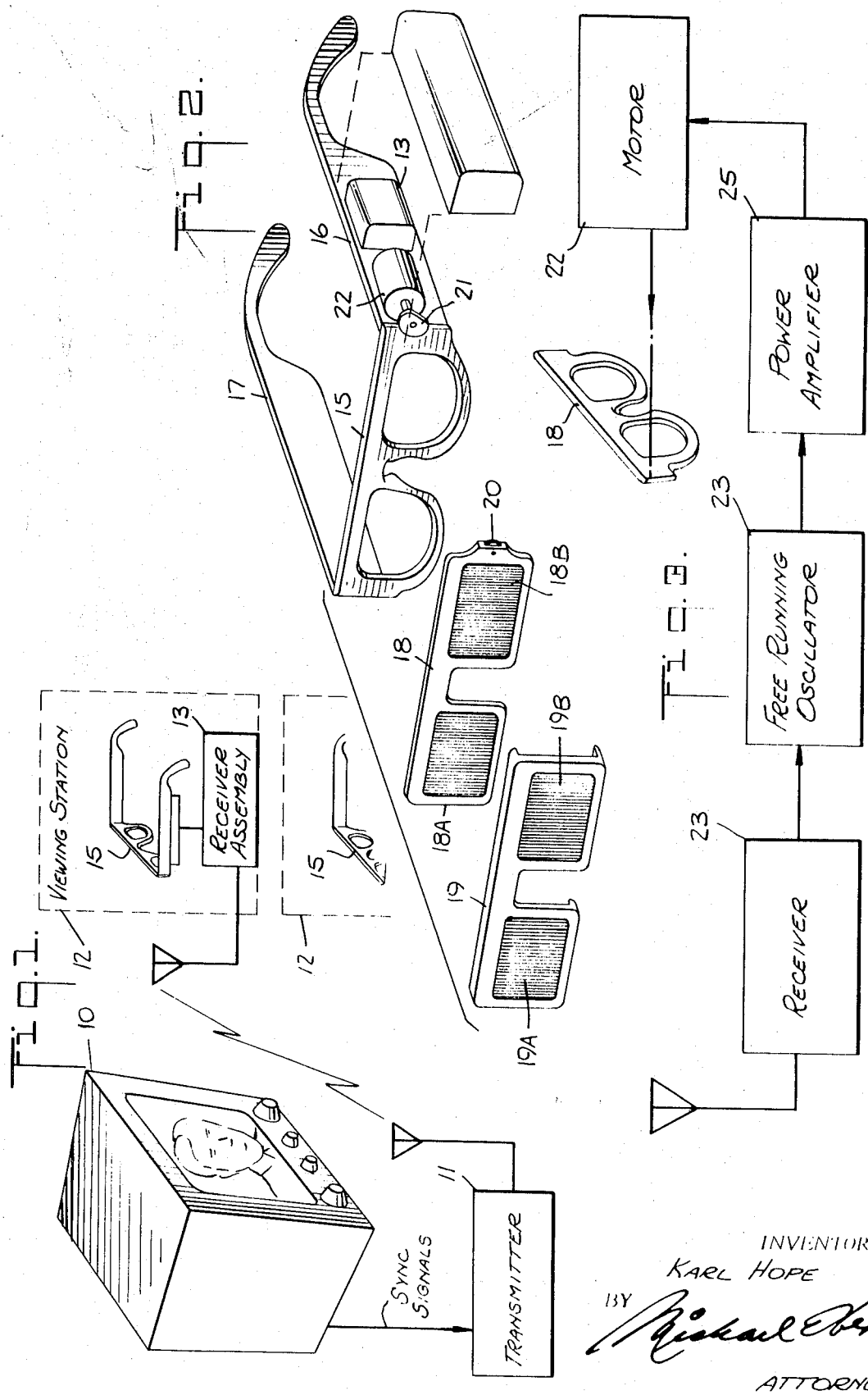

SYNCHRONIZED STEREOSCOPIC SYSTEM

This invention relates generally to stereoscopic systems, and more particularly to a three-dimensional motion picture or television system wherein two displaced images of a scene are sequentially projected on a screen and observers are provided with shuttering spectacles which alternately expose the left and right eyes to these images in synchronism therewith.

Because the two eyes of a human observer are located at spaced positions along axes known as the ocular parallax, they perceive slightly different retinal images. This retinal disparity does not give rise to blurred or confused pictures, for the brain compares and combines the separate sets of ocular sensations to achieve three-dimensional or depth perception. Such depth perception is absent in conventional motion picture and television presentations, for the picture on the screen is two-dimensional and many visual, dramatic and aesthetic values are lost.

All existing stereoscopic systems, whether of the motion-picture or television type, are adapted to duplicate the visual process of depth perception and thereby afford realistic three-dimensional effects. They include a stereo camera to take two slightly displaced pictures of a scene, and means to present these pictures so that the left and right eyes of the observer see only the related picture. To be effective, the arrangement must be such that the two eyes perceive mutually exclusive views.

In one known form of stereoscopic motion-picture photography, the two separate pictures are recorded with a two-lens camera wherein the lenses are separated by a distance of 6.5 cm., which is the mean interocular spacing. The two pictures are thereafter projected simultaneously on a common screen, but are polarized differently by a pair of Polaroid discs covering the projecting lenses and arranged with their optical axes perpendicular to each other. The observer is required to wear a pair of glasses fitted with another set of Polaroid discs, also placed with their axes at right angles to each other. The simultaneous perception of the two different flat pictures yields the desired stereoscopic effect.

The polarized system has many practical drawbacks, and as a result has enjoyed very limited commercial success. Even more deficient is a stereoscopic system making use of selective color filters to separate the pictures. Such filters fail to provide distinct separation of the displaced images.

Another known stereoscopic system which affords superior results, involves sequential rather than simultaneous projection of the two pictures at a sufficiently high rate that the eyes are insensitive to this fact and behave as if the presentation were concurrent. This makes it possible to use a conventional projector with a single film strip, rather than parallel strips for the displaced images. In a system of this type, the observer is provided with shuttering viewing devices adapted to expose the eyes to the screen alternately and in synchronism with the sequential presentation of images.

For the sequential system to operate properly, it is essential that the shuttering action be perfectly coordinated with the presentation, whereby the images are maintained in their correct sequence and phase, and the left and right images are thereby seen for equal times, in alternating sequence. To this end, existing systems provide wire or cable lines between each observation station in the audience and the projector, the lines carrying sync signals generated at the projector.

From the practical standpoint, the need to physically link each observer with the projection booth is a serious drawback, for in a theatre having, say, a thousand seats, the installation costs of such an arrangement are almost prohibitive. Moreover, if the theatre is a general-purpose auditorium in which stereoscopic presentations are given only on special occasions, the cost of installing a stereoscopic system which requires lines to be strung from the projection booth to each seat, is simply not justifiable. Also, with a system of this type, the observer must remain at the observation station and is not free to choose other viewing positions.

In a closed-circuit television system wherein programs of a specialized character are presented to an audience for promotional, educational or other purposes, the use of a stereoscopic system offers many advantages, not only by reason of the heightened interest created by three-dimensional viewing, but also because the observers receive a clearer and more detailed view. Where depth perception is lacking, many details are obscured.

Such closed-circuit 3-D, TV presentations are valuable, for example, where a new product is being demonstrated. They are particularly useful in closed-circuit television viewing of surgical operation, where three-dimensional presentations are much more revealing. But in such situations it is ordinarily not feasible to wire each observer in the theatre to the television display device. Moreover, existing shuttering viewing devices are cumbersome and uncomfortable to the wearer.

Accordingly, it is the main object of this invention to provide a stereoscopic system of the sequential type wherein two displaced images of a scene are viewed through shuttering spectacles which alternately expose the right and left eyes of the observer in synchronism with the sequential presentation, without, however, the need for a wire link between the projection device and the various viewers.

More specifically, it is an object of the invention to provide a wireless system of the above type wherein sync signals are transmitted from the projection device over a high-frequency carrier and are intercepted by receivers at various portable viewing stations where the signals act to coordinate the operation of the shuttered spectacles with the presentation.

Also an object of the present invention is to provide a novel shuttering spectacle which is of simple, light, compact design, and which may be worn comfortably by the observer for prolonged viewing periods.

Yet another object of the invention is to provide a sequential stereoscopic system which is efficient and reliable in operation and which may be constructed and installed at relatively low cost.

Briefly stated, these objects are accomplished in a system in which displaced images of a scene are sequentially projected onto a screen by a motion picture or television device such that the right and left images appear alternately thereon for equal times, the projection device also generating sync signals which indicate the points in time at which the alternate images are presented.

The sync signals modulate a radiofrequency carrier which is radiated in the viewing area and is intercepted by individual receivers at various viewing stations, the sync signals being applied to motor-driven shuttering spectacles having left and right shuttering elements adapted to open and close alternately at a rate and in a phase controlled by the sync signals, thereby coordinating the shuttering action with the sequential presentation.

For a better understanding of the invention, as well as other objects and further features thereof, reference is made to the following detailed description to be read in conjunction with the accompanying drawing, wherein:

FIG. 1 is a block diagram of a stereoscopic system in accordance with the invention;

FIG. 2 is an exploded perspective view of the shuttering spectacles; and

FIG. 3 is a block diagram of an individual receiving station.

Referring now to FIG. 1, there are shown the basic elements of a stereoscopic system in accordance with the invention. The stereoscopic pictures are presented on a screen by a motion-picture projector or a television display device 10. The manner in which the pictures are taken will not be described in detail, for two-lens stereo motion picture and television cameras for this purpose are well known. All that is important for present purposes, is that the display on the screen be formed by right and left pictures of a scene and that they be presented for equal times in alternating sequence.

Synchronization information is generated by the projection equipment. Thus in the case of motion-picture projection, the film containing stereo images for sequential presentation may include an auxiliary track parallel to the sound track, with pulses recorded on the former to indicate the points in time at which the left and right images are presented. These pulses may be of different wave shape or frequency to provide the necessary left-right distinctions and to facilitate discrimination at the receiving station.

In practice, by the use of sync pulse frequencies above the audio range, one may record these pulses on the sound track without interfering with the audio system, selective filters being used to extract the sync pulses therefrom. Where the stereoscopic system includes stereophonic sound tracks, the sync pulses from the left and right images may be imposed on separate sound tracks on the film.

In the case of stereoscopic television, sync signals for the stereo system may be added by a slight modification of existing circuits in a standard TV receiver. In the standard TV receiver, a vertical blanking signal is generated every sixtieth of a second to indicate the termination of a field, during which time a full (but half resolution) image is generated. If one pulse were to contain right-eye information and the next, left-eye information, a very simple modification of the vertical blanking signal may be used to distinguish the blanking signal terminating the field containing right-eye information, from that containing left-eye information. By modifying the standard sync separation circuits used to distinguish horizontal and vertical synchronization signals, one is then able to discriminate between the "right" and "left" fields.

The sync signals generated in the display device (motion picture or TV) are fed to a transmitter 11 to modulate a radiofrequency carrier which is radiated into the theatre or wherever else the system is installed. Transmitter 11 and the receivers associated therewith are expressly designed for short-range operation. For this purpose, a standard communication system of the type currently used for short-range wireless communication on sound stages and studio floors in motion-picture, television and radio industries, may be used. Typical commercial units for this purpose are those designated as Model CS-10 Transmitter and PM-10 Receiver, distributed by Round Hill Associates of New York City.

The modulated radio carrier is intercepted at various viewing points in the theatre or observation area by means of portable viewing stations, generally designated by numeral 12. Each station is equipped with a receiver assembly 13 to pick up the modulated carrier and to extract the sync signals therefrom, which signals are applied to a motor adapted to drive the shuttered viewing spectacle 14 in a manner coordinating its operation with the visual presentation.

The details of the shuttered spectacles can best be appreciated from FIG. 2. As pointed out previously, the basic requirement for this viewer is that there exist a shuttering element for each eye so timed that the eye is exposed only when the image intended therefor is being presented.

To this end, the viewer is in the form of a spectacle frame 15 having hinged temple pieces 16 and 17 so that it may be worn very much in the fashion of eyeglasses. Fitting over the lens openings of the frame is a movable shutter section 18 provided with a pair of transparent, flat glass panes 18A and 18B. Overlying movable shutter section 18 is a fixed shutter section 19 which is so secured to the frame that movable section 18 is free to reciprocate therebetween. Fixed section 19 is provided with a pair of transparent, flat glass panes 19A and 19B which lie in registration with the lens openings on frame 15.

Panes 18A, 18B, 18C and 18D all have opaque vertical stripes printed or otherwise marked thereon, these stripes all being of equal width and having spaces therebetween substantially equal to the width of the stripes. Thus when the stripes of movable pane 18A are aligned with the stripes of fixed panel 19A, the spaces therebetween are likewise aligned to permit light-transmission therethrough. But when the stripes of pane 18A are aligned with the spaces of pane 19A, light passage is blocked. The same relationship exists as between panes 18B and 19B, except that the stripe positions thereon are out of phase with those of panes 18A and 19A, so that when one set is optically open, the other is optically shut.

By making the stripes relatively narrow and placing the shutter elements close to the eyes, as is the case in the spectacle structure shown, the eyes are unable to focus on or resolve the stripes. Hence when a shutter element is open, the exposed eye is not cognizant of the stripe pattern. The only effect of the stripes is to somewhat reduce the intensity of the light passing through the associated panes, so that it may be necessary to provide somewhat brighter screen presentations than is conventional.

Movable shutter section 18 is provided at one end with a cam follower 20 which is engaged by a drive cam 21 attached to the rotary shaft of a synchronous motor 22 so arranged that when the motor operates, section 18 is reciprocated to alternately shift the striped panes 18A and 18B from an extreme position in which the stripes of pane 18A are in line with the spaces of pane 19A, while the stripes of pane 18B are in line with the spaces of pane 19B, to another extreme position in which the reverse relationship exists. Thus as the motor turns, the left and right eyes are alternately exposed sequentially. The other end of section 18 is spring-biased (not shown) to cause it to follow the cam action.

The receiver assembly 13 which energizes and governs the action of synchronous motor 22 is mounted on the templepiece 16. This piece is made relatively broad for this purpose. The receiver assembly is formed by microelectronic modules in accordance with well-known techniques, and is therefore highly compact and lightweight. The motor which is also mounted on the templepiece is of the miniature type, and has low current requirements, for little power is needed to drive the shutter element. In practice, an electromagnetic stepping device may be used in place of the motor.

The receiver assembly, as shown in FIG. 3, comprises a radio receiver 23 tuned to the carrier and adapted to demodulate the incoming signal to derive therefrom the sync pulses. These pulses are applied to a free-running oscillator 24 whose operation is caused to correspond in phase and frequency to that at which the two displaced images are alternately presented, the sync pulses serving to lock in the oscillations.

These oscillations are fed to a power amplifier 25 to produce an alternating voltage of sufficient intensity to operate motor 22. In practice, the entire assembly 13 may be battery-operated, the battery being housed in the other templepiece 17 of the spectacles to balance the load thereon.

In place of the mechanical shuttering action disclosed above one may use voltage-actuated crystals to alternately transmit a block light passage on the spectacles.

It will be evident from the foregoing that no wire connection of any sort exists between the projector and the various viewing stations, and that one may use a number of viewing stations at convenient locations within the theatre rather than a preassigned position.

The system in accordance with the invention is useful in motion picture and in television presentations, not only of the closed circuit type, but also for general television and cable broadcasting. In place of shutters formed of spaced, opaque stripes, one may use shutter elements formed by alternate bands of Polaroid material whose axes are at right angles, so that when the movable element is positioned with respect to the fixed element in a condition where the polarization of these elements is identical, light will be transmitted, and when positioned so that the polarization is in opposition, light will be blocked.

What is claimed is:

1. A stereoscopic system adapted to provide stereoscopic images on a common screen which are viewable by observers at random positions within a prescribed viewing area, comprising:

A. means sequentially to project on said common screen left and right images of a scene to produce a presentation in which left and right images of a scene are shown alternately for equal time periods.

B. means coupled to said projection mans to generate sync signals which indicate the points in time at which the images alternately appear, C. means to generate a high-frequency carrier and to modulate said high-frequency carrier with said sync signals and to radiate said modulated carried within said viewing area, and D. portable viewing stations borne by said observers in said area to observe the common screen, each station including a shuttering spectacle having left and right eye elements that open and close alternately, receiver means to intercept said carrier to extract the sync signals therefrom, and motor means to control the action of the spectacle in accordance with said sync signals to cause said elements to operate at a rate and phase in accordance with the screen presentation, whereby viewing of the images in coordinated with the shuttering action to provide depth perception, said spectacle having a fixed shutter section constituted by left and right eye openings having transparent panes therein, with spaced vertical stripes thereon and a movable shutter section with vertical stripes thereon which allow for light transmission when aligned with the stripes of the fixed section and block transmission when the stripes are aligned with the spaces of the fixed section, said fixed and movable shutter sections being close to the eyes of the observer wearing the spectacle and the stripes on the sections being relatively narrow whereby the eyes are reciprocation to focus on or resolve the stripes, said motor means being operatively coupled to said movable section to effect reciprocation thereof and alternately to block transmission through the right and left eye openings.

2. A system as set forth in claim 1, wherein said projection means is a motion-picture film projector.

3. A system as set forth in claim 2, wherein said sync signals are contained on a track in the film strip.

4. A system as set forth in claim 1, wherein said projection means is a television display device.

5. A system as set forth in claim 4, wherein said sync signals are derived from the vertical blanking signal television circuit.

* * * * *

UNITED STATES PATENT OFFICE
CERTIFICATE OF CORRECTION

Patent No. 3,621,127      Dated November 16, 1971

Inventor(s) Karl Hope

It is certified that error appears in the above-identified patent and that said Letters Patent are hereby corrected as shown below:

Column 6, claim 1, line 7, instead of "reciprocation"

there should have appeared

-- unable to --

Signed and sealed this 30th day of May 1972.

(SEAL)
Attest:

EDWARD M. FLETCHER, JR.
Attesting Officer

ROBERT GOTTSCHALK
Commissioner of Patents